(12) United States Patent
Hauser (10) Patent No.: US 8,751,628 B2
(45) Date of Patent: *Jun. 10, 2014

(54) SYSTEM AND METHOD FOR PROCESSING USER INTERFACE EVENTS

(75) Inventor: Robert R Hauser, Frisco, TX (US)

(73) Assignees: Suboti, LLC, Frisco, TX (US); Paul A Lipari, Frisco, TX (US)

( * ) Notice: Subject to any disclaimer, the term of this patent is extended or adjusted under 35 U.S.C. 154(b) by 175 days.

This patent is subject to a terminal disclaimer.

(21) Appl. No.: 12/435,751

(22) Filed: May 5, 2009

(65) Prior Publication Data

US 2010/0287229 A1    Nov. 11, 2010

(51) Int. Cl.
| | |
|---|---|
| *G06F 15/16* | (2006.01) |
| *G06F 15/173* | (2006.01) |
| *G06F 7/04* | (2006.01) |
| *G06F 15/18* | (2006.01) |
| *G06F 21/36* | (2013.01) |
| *H04L 29/06* | (2006.01) |
| *H04L 29/08* | (2006.01) |
| *G06F 21/30* | (2013.01) |
| *H04L 12/26* | (2006.01) |

(52) U.S. Cl.
CPC ............. *G06F 21/36* (2013.01); *G06F 21/30* (2013.01); *H04L 63/083* (2013.01); *H04L 63/0846* (2013.01); *H04L 12/2618* (2013.01); *H04L 43/04* (2013.01); *H04L 29/08675* (2013.01)
USPC ................ 709/224; 709/231; 726/22; 706/12

(58) Field of Classification Search
CPC ..... G06F 21/30; G06F 21/36; H04L 12/2618; H04L 29/08675; H04L 43/04; H04L 63/083; H04L 63/0846
USPC ................ 709/220, 224, 231; 726/22; 706/12
See application file for complete search history.

(56) References Cited

U.S. PATENT DOCUMENTS

| | | | |
|---|---|---|---|
| 6,848,108 | B1 | 1/2005 | Caron |
| 7,051,042 | B2 | 5/2006 | Krishnaprasad et al. |
| 7,725,395 | B2 * | 5/2010 | Rui et al. ........................ 705/50 |
| 2005/0144441 | A1 * | 6/2005 | Govindarajan ............... 713/160 |
| 2005/0183143 | A1 * | 8/2005 | Anderholm et al. ............ 726/22 |
| 2008/0301808 | A1 * | 12/2008 | Calo et al. ........................ 726/23 |
| 2010/0070620 | A1 * | 3/2010 | Awadallah et al. ........... 709/224 |

FOREIGN PATENT DOCUMENTS

WO   WO 2008091675 A1 *  7/2008

OTHER PUBLICATIONS

"Spam driving innovation in artificial intelligence", Apr. 20, 2009, Walden University, pp. 1-5, "http://thinkup.waldenu.edu/archive/item/8747-spam-arms-race-driving-innovation-in-artificial-intelligence".*

(Continued)

*Primary Examiner* — Brian J Gillis (57) ABSTRACT

A system and method to detect and prevent non-human interaction between a client and a web server invokes an effect to change the event generation behavior at the client. Subsequent event streams from the client to the server are analyzed to determine whether the event streams contain events corresponding to expected reactions of a human operator at the client to the effect. Indications of non-human behavior may invoke more direct human testing, for example using a dynamic CAPTCHA application, or may cause a termination of the client/URL interaction.

17 Claims, 7 Drawing Sheets

(56) References Cited

OTHER PUBLICATIONS

"SQ-PIX" Apr. 15, 2009, Carnegie Mellon University, "http://replay.waybackmachine.org/20090415142110/http://server251.theory.cs.cmu.edu/cgi-bin/sq-pix".*

Yao, Laura, "Latest weapon against spam also enlists computer users to assist the Internet Archive", Pittsburg Post-Gazette, Jul. 18, 2007, "http://www.post-gazette.com/pg/07199/802310-96.stm".*

Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

* cited by examiner

SYSTEM AND METHOD FOR PROCESSING USER INTERFACE EVENTS

FIELD OF THE INVENTION

This invention relates to a system, method and computer readable medium for processing of user interface events.

BACKGROUND OF THE INVENTION

In many web based applications, it may be necessary to verify that a human is using a computer, rather than an automated computer program, as one example. One well known solution for use with web based forms, is to use an application such as CAPTCHA (Completely Automated Public Turing test to tell Computers and Humans Apart). A CAPTCHA is a type of challenge-response test presented on screen to determine if the user is a human. A problem with using CAPTCHAs is that they can be automatically solved by computer algorithms. Further, humans can be used to solve CAPTCHAs the first time, with the response being recorded with the original challenge so if the same challenge is reused later a computer program can respond without assistance from a human. CAPTCHAs can be annoying to users and can typically only be used at predetermined locations within an application (e.g. a web form during user logon).

An alternative solution, often used in video games is to insert random events. Random events interrupt some otherwise predictable order of events by presenting new activities to the player/user. These are usually used to discourage players from using automated means to artificially gain experience within a gaming environment. Random events are annoying to users/players unless well crafted within the web page/game. Random events do not occur at predetermined locations but may require ongoing background analysis to estimate when a user/player may be using automated means of control.

An alternative system and method for determining whether web page interactions are human or non-human is described in the Applicant's co-pending application Attorney Docket No. Hauser001, the contents of which are herein incorporated by cross reference. In the Applicant's solution, event streams generated at the client device are analyzed by a server, such as the web server or a classification server, in order to determine whether the event streams that have been generated match known human or non-human derived event streams. As event stream processing becomes more and more commonplace, it is inevitable that computer programs will be created that attempt to generate human-like event streams.

What is required is a system, method and computer readable medium for processing user interface events that can be used to thwart attempts by non-human systems to produce human-like event streams.

SUMMARY OF THE INVENTION

In one embodiment of the disclosure there is provided a method for determining an event generator type of an interaction between a client and a web server. The method comprises providing an effect to the client to invoke an event stream response in events generated at the client and receiving an event stream from the client. The received event stream is analyzed to determine a response to the effect and thus to determine an event generator type from the response.

In one embodiment of the disclosure there is provided a system for testing an interaction between a client and a web server. The system comprises an event module configured to invoke an effect in the client, and analyze an event stream received from the client to determine whether a response to the effect is a human dependent response.

In one embodiment of the disclosure there is provided a computer-readable medium comprising computer-executable instructions for execution by a first processor and a second processor in communication with the first processor, that, when executed cause the first processor to determine if a message to invoke a change in event generation behavior is required, generate the message, and send the message to the second processor. The instructions, when executed, also cause the second processor to receive the message, and invoke the change in the event generation behavior.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
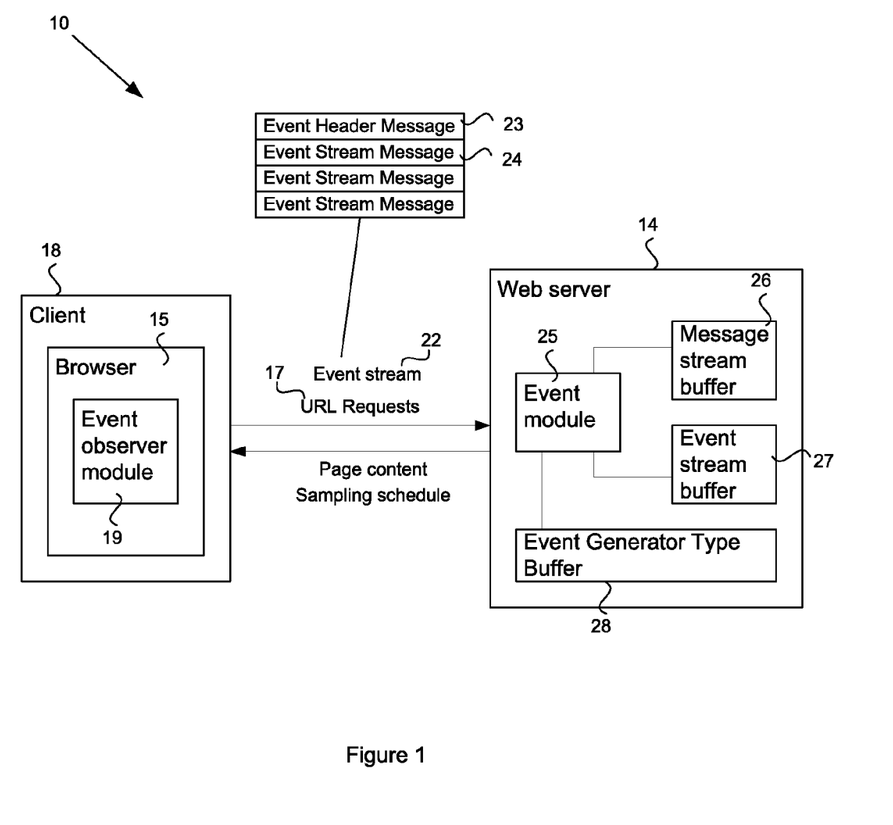
FIG. 1 illustrates a system for determining an interaction type of a webpage interaction.

In FIG. 1, there is shown a system 10 in accordance with an embodiment of the disclosure that may be used for determining whether interface events are generated by humans. The system 10 includes a web server 14 that responds to URL requests 17 from clients 18, and in response provides web page content corresponding to the URL requests. The web page content is displayed in a web browser 15 of the client. In the process of requesting and receiving a webpage from the web server 14 and in subsequent interactions on the webpage, various user generated events such as mouse clicks, mouse moves, text selections etc occur within the web browser 15. Other event types will be apparent to a person skilled in the art. The clients 18 include an event observer module 19 that observes and records these events. The clients 18 may generate an event stream 22 which will typically include an event header message and one or more event stream messages 24. The clients 18 communicate the respective event streams 22 to the web server 14 based on a sampling schedule set by a sampling function.

The client applications may operate on any suitable web enabled device including a PC, laptop, hand held browser, mobile phone, or any other suitable device. Communications between the web server 14 and the clients 18 may be provided using wired or wireless devices and using appropriate protocols.

The initial sampling function can be embedded in javascript of the page that is sent from the web server 14 to the client 18. Alternatively or in addition, the initial sampling function can be a set of pre-assigned functions for given times, or may be a cyclic function.

The web server 14 includes an event module 25 which receives the event streams 22 from the client 18 and records information from and about the event streams 22 into various buffers dedicated to the particular client/URL interaction such as a message stream buffer 26, an event stream buffer 27 and an event generator type buffer 28. While the event module 25 and the associated buffers 26, 27, 28 are shown within the web server 14, in one embodiment, a separate event handling server may be provided to process the event streams 22 using the methods and techniques to be described below. Thus references made herein to the functions of the web server may be considered to be references to an event handling server where appropriate.

As described in the Applicant's co-filed application Attorney Docket No. Hauser001 referenced above, the web server 14 may process components of the received event header message and event stream messages to form an instance. By comparing the instance with a dataset of prerecorded instances having a known event generator type, i.e. human, computer assisted human, non-human etc, the event generator type of the current instance can be determined.

Figure 8:
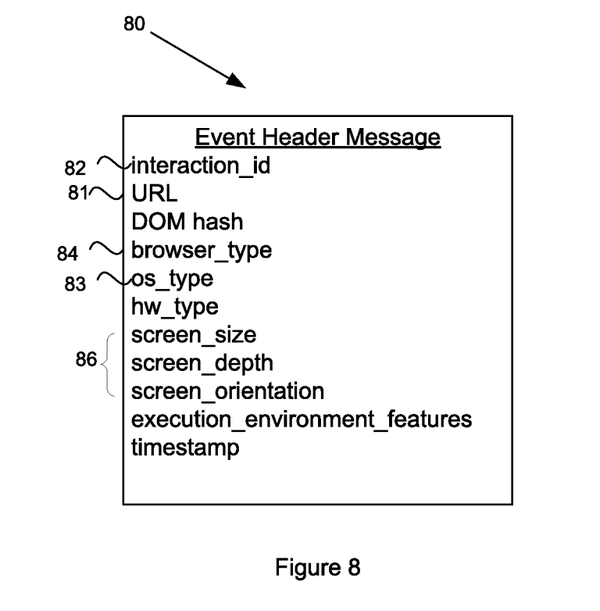
FIG. 8 illustrates an example of an event header message.
Figure 9:
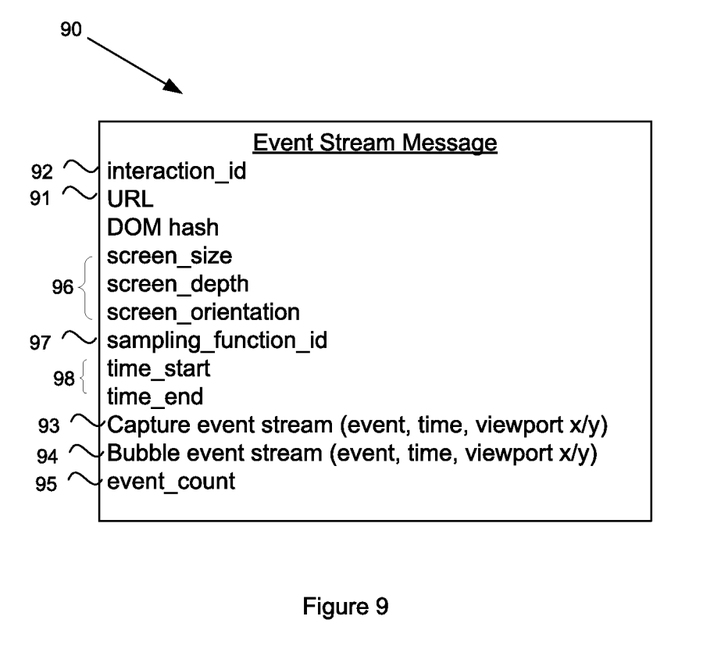
FIG. 9 illustrates an example of an event stream message.

An example of an event header message 80 is illustrated in FIG. 8 and an example of an event stream message 90 is illustrated in FIG. 9. The messages 80, 90 show a number of components that can be used. Primarily, an Interaction_ID 82, 92 uniquely identifies an interaction between the client 18 and the web server 14 and aids to identify the particular event stream 21. The event header message 80 and the event stream message 90 may also identify the Uniform Resource Locator (URL) 81, 91. Fixed parameters such as the operating system 83 and browser type 84 may form part of the event header message 80. Screen parameters 86, 96 such as the screen size, depth and orientation may be included in either or both of the event header message 80 or the event stream message 90. A capture event stream 93 and a bubble event stream 94 specifies the events recorded in respective event capture and bubbling phases during the web page interaction. Each event may be indicated by the event type, time and x/y location relative to the viewport. Not all web browser types support event capture, and thus the capture event stream 93 may be empty. Where required, events missing from the event bubble stream may be inferred, for example as described in the Applicant's co-pending application Attorney Docket No. HAUSER002, the entire contents of which are explicitly incorporated herein by reference. Timing parameters 98 may indicate the relevant period over which the event stream message 90 is current. The event stream message 90 may include a sampling_function_id field 97 that identifies the sampling function (event observer mask) used by the event observer module 19 to downsample the total number of events observed at the client 18. An event_count field 95 may indicate the total number of unique events observed by the event observer module including those events not included in the event stream message due to the current sampling function excluding them.

Figure 2:
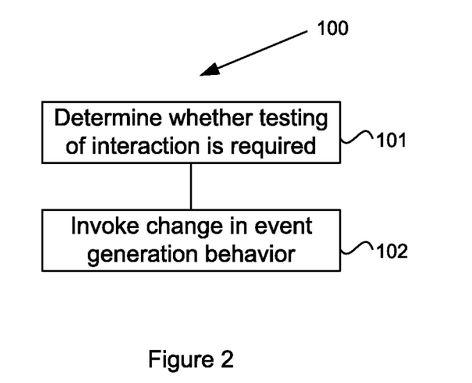
FIG. 2 illustrates a method for testing a client/URL interaction.

With the advent of event stream analysis for event generator type determinations, it is inevitable that attempts will be made to thwart the determination process with programs designed to automatically generate human-like event streams, that is, event streams that appear to have been generated in a human interaction with a web page. Thus, in order to combat this kind of attack, in one embodiment depicted in the flowchart 100 of FIG. 2, a method includes determining whether testing of a client/URL interaction is required 101 and testing the interaction by invoking a change in the event generation behavior 102.

Figure 3:
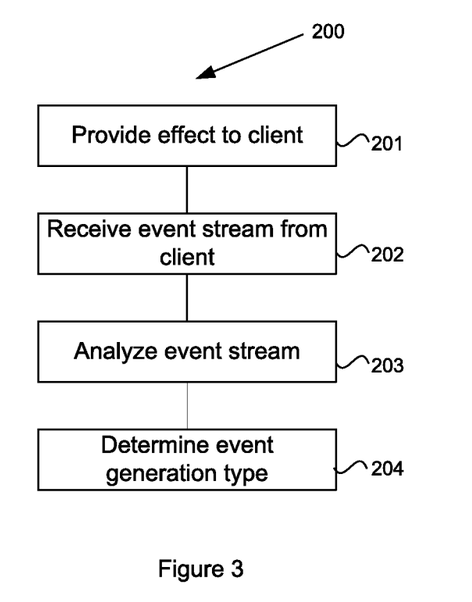
FIG. 3 illustrates a method for determining an event generation type.

A method for determining an event generator type of an interaction between a client 18 and the web server 14 will now be described with reference to the flowchart 200 of FIG. 3. At a first step 201, an effect is provided to the client 18 from the web server 14 to invoke an event stream response in events generated at the client 18. The server 14 receives an event stream from the client that is responsive to the effect (step 202). The server 14 analyzes the event stream to determine a response to the effect 203 and determines an event generator type from the response 204.

Determining whether testing of a client/URL interaction is required may be based on previously received event streams. When an event header message is received, the message arrival time is recorded and buffers including the message stream buffer 26 and the event stream buffer 27 are prepared for the particular client/URL/interaction_id. The event header message is recorded into the message stream buffer 26 together with timestamp information.

Figure 4:
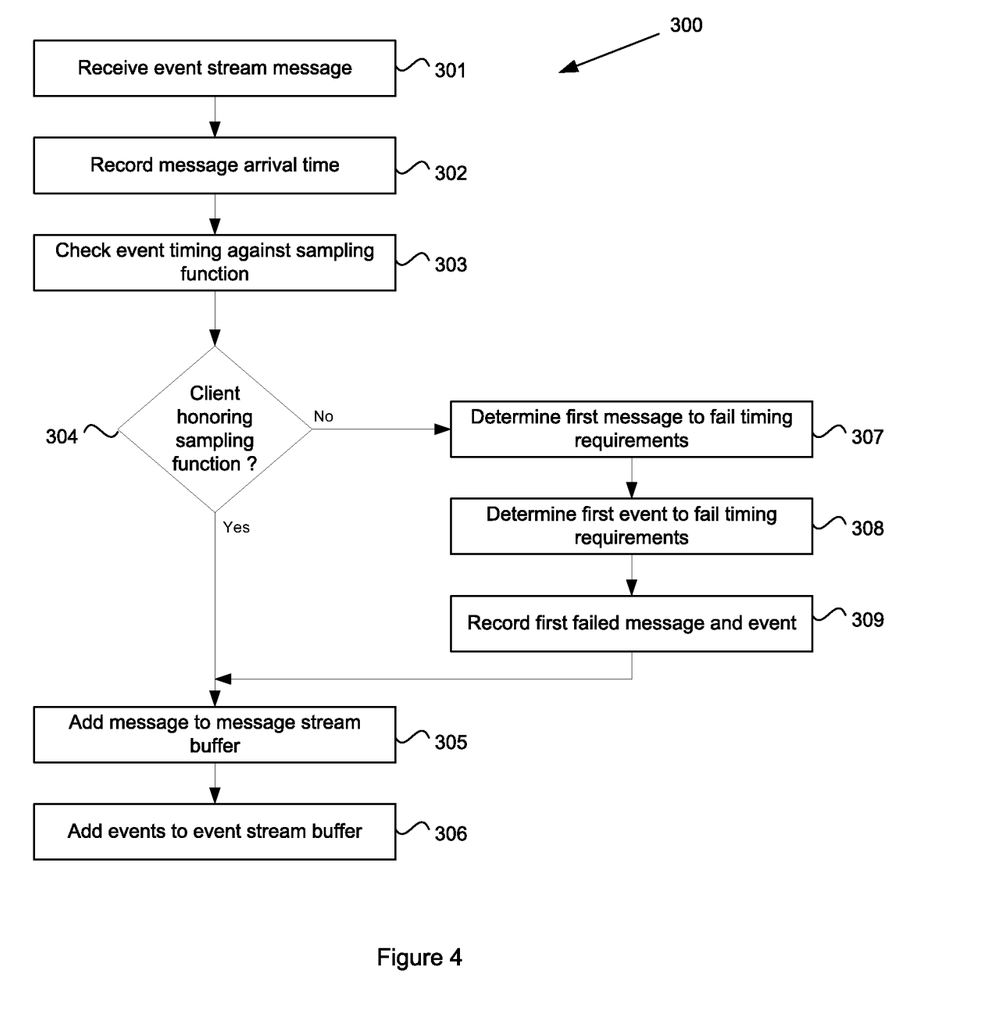
FIG. 4 illustrates a process for recording an event stream.

In FIG. 4, there is depicted a process 300 for receiving an event stream message 22. At step 301, an event stream message 24 is received at the server 14. The message arrival time of the event stream message 24 is recorded at step 302. At step 303, the events of the event stream message 24 and their respective times are checked against the event sampling function that the client's event observer module 19 is supposed to be using. If the client is honoring the sampling function, determined at step 304, then the event stream message 24 can be recorded into the message stream buffer at step 305 and the events of the event stream message 24 may be added to the client's event stream buffer (step 306). If decision 304 determines that the appropriate sampling function is not being honored, then the server 14 determines the arrival time of the first message that has failed the timing requirements (step 307) and the first event that has failed the timing requirements (step 308). The first event time and the first message time when the sampling function was ignored are then recorded at step 309 before the buffering of the event header message and the events of the event stream messages (steps 305 and 306) are performed. In addition, a flag may be set that indicates that the client is not honoring the sampling function.

Figure 5:
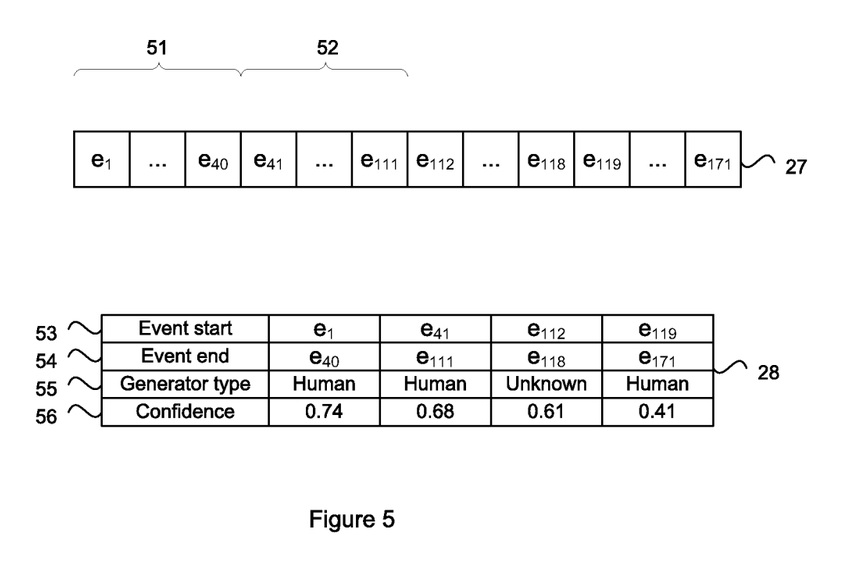
FIG. 5 illustrates a process for determining and buffering an event generation type.

Periodically, such as in accordance with a timer, cyclic function, or when the buffer utilization of either the message stream buffer 26 or the event stream buffer 27 reaches a predetermined threshold, an analysis of the event stream is performed to determine a current event generator type. The event generator type may be recorded in an event generator type buffer assigned for this interaction. Examples of the event generator type may include human, non-human, computer-assisted human, malicious program A, malicious program B, etc. The event generator type may be determined as described above and as described in more detail in the Applicant's co-filed application Attorney Docket No. Hauser001, mentioned above. In one embodiment, shown in FIG. 5, an event stream buffer 27 stores events e1 to e171 for an interaction with a particular client and a particular URL. In the event stream analysis, the events may be broken into ranges, such as range 51 covering events e1 to e40 and range 52 covering events e41 to e111 etc. The ranges 51 and 52 may or may not overlap. Instances may be formed for each of the event ranges and a determination of the event generator type, with associated confidence score, may be made for those instances. For example, the instance may be compared to instances within a prerecorded dataset having a known event generator type, as described in application Attorney Docket No. Hauser001 mentioned above. The event generator type may be determined to be the prerecorded instance that most accurately matches the current instance with the degree of match being indicated by the confidence score. An event generator type buffer 28 may store the event ranges including a starting event 53, a final event 54, a generator type in respect to the event range 55 and a confidence score 56. Further details regarding forming the prerecorded dataset are described in application Attorney Docket No. Hauser001 mentioned above.

In one embodiment, the event stream analysis may compensate for expected or invoked reactions to artifacts and effects sent by the web server 14 to the client 18, as will be described in greater detail below. For example, an expected swirl of the mouse pointer, or an invoked click of the mouse may be compensated for, such as by removing these events from consideration in the event stream processing. Alternatively or in addition, expected human-dependent reactions that are detected in the event stream, such as the swirl of the mouse pointer or invoked click described previously, may cause a flag to be set. In one embodiment, the flag may indicate that an expected event stream did in fact occur. In one embodiment, the event generator type flag may be set depending on whether an expected human-dependent reaction was detected in the event stream. Alternatively the detection of a human-dependent reaction may be used as one of several features that form an instance for classification. The result of the classification may set the event generator type field.

Figure 6:
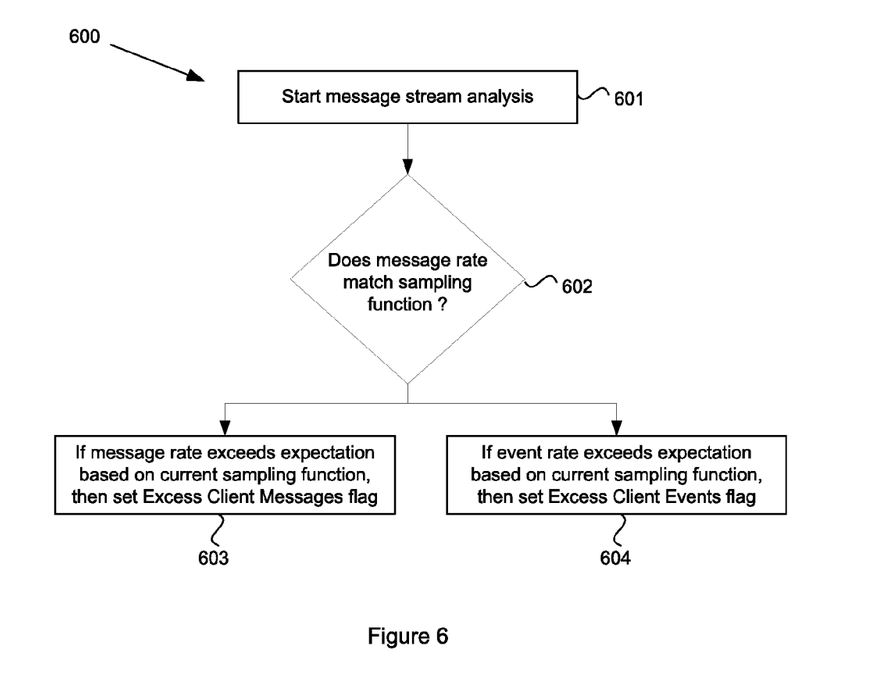
FIG. 6 illustrates a process for analyzing a message stream.

Also periodically, the server may analyze the message stream. The process of analyzing the message stream is depicted in the flowchart 600 of FIG. 6. At step 601, a periodic timer, buffer utilization threshold or similar, determines that an analysis of the message stream is required. At step 602, a timestamp analysis is performed for the messages in the message stream buffer. The timestamp analysis determines whether the message rate matches the rate specified by the sampling function for the particular client interaction. The timestamp analysis may take account of any network latency issues. If the message rate exceeds the expectation determined by the current sampling function, then an Excess Client Messages flag is set for the range of messages analyzed (step 603). A feature of the presently described protocol is that any successful automated attack from a malicious client will be rate limited such that events are delivered no faster than a typical human rate. Thus, if the event rate exceeds a human-dependent expectation, then an Excess Client Events flag is set for the range of events analyzed (step 604).

The event rate is determined by the event generator type (e.g. a human). The expected event rates for different kinds of event generators (e.g. human, malicious computer program A, malicious computer program B, computer assisted human, etc) are not revealed to the client and so are not part of the sampling function. The expected event rate may be known from prior experience. For example, event rate expectations may be learned from training datasets as described in the Applicant's co-pending application Attorney Docket No. HAUSER002 referenced above. Event rate expectations may vary based on subgroups of human event generators, such as human using a keyboard, human using a mouse, human using a touchscreen, or a human using accessibility enhancing software such as for the disabled. In addition, event rate expectations may be different for different activities, such as skimming, reading, viewing and authoring.

Figure 7:
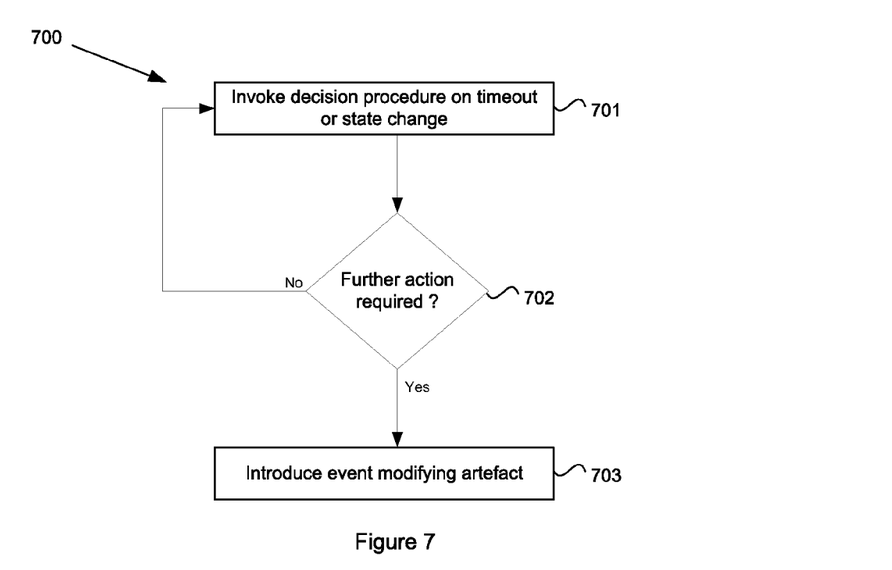
FIG. 7 illustrates a decision process.

Once the message stream and event stream analysis has been performed, a decision procedure may be enacted. A flowchart 700 depicting an embodiment of the decision procedure is shown in FIG. 7. The decision procedure is invoked by a periodic timer or internal state change (step 701). A decision node 702 determines whether a further testing is required. Inputs to the decision node may include a flag indicating whether the client is honoring the sampling function, described above; whether the message stream is identical to a prior received message stream (thereby indicating a non-human interaction); whether the event stream is identical to a prior received event stream; the Excess Client Messages flag; the Excess Client Events flag; the Event Generator Type buffer value; the Event Generator Type confidence score; and one or more of the previously introduced artifacts along with their received responses (whether or not an introduced artifact resulted in an expected change in the event stream). Other triggers may specifically indicate that testing of the event streams for a particular client or URL are required. In addition, random testing of URLs and clients may occur.

The decision node may rely on the values of preset flags or may invoke other calculation procedures for evaluating the input values over a recent time window.

The decision node determines, from the inputs, the likelihood that an attack is being made on the server and whether further actions or testing are required. If the flags and other inputs indicate a human or other allowable interaction, then no further action is taken. However, if the flags and other inputs indicate a possible attack, then the server may introduce artifacts and effects (step 703) that invoke a detectable response in the event stream and/or the message stream.

In one embodiment, the server invokes a change in the sampling relationship between the client and the server. For example, the server 14 may send a Change Sampling Message to the client. The Change Sampling Message includes a new sample_function_id that is used in future Event Stream Messages. The new sample_function_id may invoke a change in at least one of the sampling parameters. In one embodiment, the sample_function field may be changed to set a new event observer mask for downsampling the events observed by the event observer module 19. In one embodiment, the sample_time_slot may be changed to set a new time interval for sending event stream messages. In one embodiment, a sample_areas field may be changed to change the set of viewport regions or document object model (DOM) elements to sample the events from. Further monitoring of the sampling relationship will determine whether the client is following the new sampling parameters. Failure by the client to operate in accordance with the new sampling function may cause an error to be communicated to the client. Alternatively or in addition, the web page interaction may be terminated. Alternative error handling procedures are discussed below.

In one embodiment, the server 14 may invoke a change that is generally unnoticeable to the user. Examples of an unnoticeable change may include a small mouse pointer shift, short freeze of the mouse pointer, a small change of the viewport size, a cursor shift, the addition of a small new frame to shift the viewport, etc. The unnoticeable effect may be generated by sending a Transparent Effect Message from the web server 14 to the client 18. The Transparent Effect Message is designed to produce an expected event response in the message stream and/or the event stream. For example, a Transparent Effect Message may be sent to the client with instructions "move mouse pointer up one pixel". When the client observes a smooth mouse movement in progress it applies the requested effect by moving the mouse pointer up one pixel. For example if the mouse is moving exactly horizontally to the left (x,y) the observed location of the mouse move events might be (353,100), (350,100), (348,100). After these events have arrived the transparent effect is applied and the mouse move events might continue to arrive as (345, 101), (341, 101), (339, 101), which indicates the expected effect in the single pixel shift of the y-coordinate. Not every x-pixel traversed by the mouse is observed in the mousemove (or mouse move) events due to the speed of the mouse movement. The single pixel effect is observable in the resulting event stream sent to the server. An attempt to artificially generate mousemove event stream may not include the pixel movement (the y coordinate 1-pixel shift) and therefore the absence of the expected observed effect may indicate a non-human client, e.g. a record and playback ("replay") attack. In one embodiment, once the effect of the mouse move event is observed, then the client may reverse the effect. Using the same example the data may arrive as follows: (353,100) (350, 100) (348,100) (345,101) (341,100) (339,100). The transparent effect was applied and as soon as it was observed the effect was removed.

The Event Module records the transparent effects that are sent as well as any expected effects to the event stream. The event module then processes the future event streams to determine whether the expected reactions occurred within a timeout period. If expected human-dependent reactions are observed, then the event generator type may be confirmed as a human event generator type. If the expected human-dependent effects are not observed, then the event generator type may be confirmed as non-human. Confirmation of a non-human event generator type may lead to a more direct human testing, such as a dynamic CAPTCHA process described below. Alternatively, confirmation of a non-human event generator type may lead to termination of the web page interaction. In most cases a high confidence score (for any particular event generator type) will be obtained and no other processing is necessary. In cases of uncertainty, i.e. low confidence scores, the dynamic CAPTCHA may be needed to get a highly confident classification.

In one embodiment, the server 14 may invoke an effect that is noticeable to a human user. Examples of a noticeable change may include a noticeable mouse pointer shift, a noticeable freeze of the mouse pointer, a change of the viewport size, a noticeable cursor shift, the addition of a new frame to shift the viewport, modification of widget behavior, etc. The noticeable effect may be generated by sending a Non-Transparent Effect Message from the web server 14 to the client 18. The Non-Transparent Effect Message is designed to produce an expected effect in the message stream and/or the event stream. In one example, a noticeable mouse freeze may invoke a shaking or otherwise large movement of the mouse by a human user. In a further example, the behavior of widgets (e.g. buttons) embedded within the page content may be modified, such as to elicit additional mouse clicks, as described in the Applicant's co-pending application Attorney Docket No. Hauser031, the entire contents of which are herein incorporated by reference. As for the transparent effects described previously, the Event Module 25 records the non-transparent effects that are sent as well as any expected reactions to the event stream. The event module then processes the future events in the event stream to determine whether the expected reactions occurred within a timeout period. The event generator type may be set based on whether the expected human-dependent reactions occurred. If the expected human-dependent reactions did not occur, the client interaction may be terminated, or further, more direct human testing may be performed. Reactions to large and noticeable effects are less predictable and precise than transparent effects. However, some effects like freezing of the mouse pointer to prompt a human user to shake or swirl the mouse may produce a sudden rapid event rate. These rapid events may be considered to be expected and human-dependent, even if the resultant event rate exceeds a typical human rate.

In one embodiment, the server 14 may invoke a dynamic CAPTCHA process in which the current client URL interaction is interrupted while a CAPTCHA application is executed. The dynamic CAPTCHA may be presented as a pop-up window or may otherwise interrupt the page display of the current webpage. While the dynamic CAPTCHA is executing, the event module 15 may still operate as normal, with the exclusion of invoking a further dynamic CAPTCHA application while the first dynamic CAPTCHA application is awaiting a response. The dynamic CAPTCHA may be treated as a separate page but with the state of the original webpage retained, thus allowing the webpage to be restored when the dynamic CAPTCHA process is completed. In the dynamic CAPTCHA process, a typical CAPTCHA test is displayed on the client that prompts a human response. A successful response to the test will cause the processing state to return to the original client/URL interaction. A non-successful test response is indicative of a non-human event generator at the client, which may cause termination of the interaction.

In cases where a non-human is detected, several actions may be undertaken. In one embodiment, the web server restricts or terminates content delivery to the non-human client. In addition, statistics and click stream data may be updated, e.g. to remove the interaction from page views, to remove the interaction's "clicks" from a pay-per-click system, etc. In addition, the web server 14 may not record or not deliver context sensitive advertisements etc.

As described in the Applicant's co-filed application Attorney Docket No. HAUSER002, referenced above, the events that may be recorded by the client's event observer module may be dependent on whether the client's web browser supports only event bubbling or supports both event bubbling and event capturing. If the browser supports only event bubbling, events that are consumed by applications of the web page and therefore do not form part of the event bubbling stream may be inferred. In one embodiment, missing events may be inferred by comparing bubble event streams with similar bubble event streams that have matching capture event streams, such that it is known what events are missing from the bubble stream. The inferring process is described in more detail in the Applicant's co-filed application mentioned above.

The embodiments may make use of different sampling functions which may be dynamically changed and allow downsampling (event observer mask) of the event streams. Thus any automated attempt to participate as a client must honor dynamically changing its data stream. Downsampling has other advantages. The large number of user interface events may overload bandwidth if all events are sent in real time. Furthermore, the full event stream may provide more information than is necessary to reliably determine the event generator type with high confidence. User interface events that are highly predictable, or that were unobservable by the event observer module 19, can be inferred on the server (see Applicant's co-pending application Attorney Docket No. Hauser002 referenced above). In particular, changing the sample region can restrict event collection to interesting areas of a web page and can ignore areas of non-interest.

In one embodiment, event streams that are responsive to invoked effects may be recorded and added to a dataset of the event module for later use. In particular, where an event generator type associated with an effect response can be confirmed, such as in a testing environment, recording the response can allow the response to be used as a comparison with subsequent responses where the event generator type is unknown or in doubt.

Figure 10:
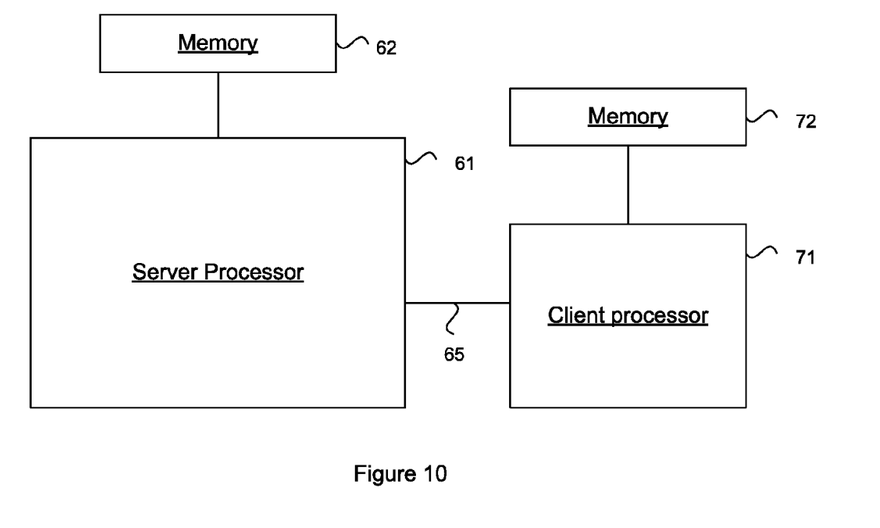
FIG. 10 illustrates a web server processor and a client processor.

In one embodiment, the web server 14 and in particular the event module 25 may include a processor 61 operatively associated with at least one computer-readable medium such as memory 62, as shown in FIG. 10. The memory 62 may store instructions that are executable on the processor 61. In addition, the memory 62 may provide the buffers for the message buffer 26, event buffer 27 and event generator type buffer 28. An instruction set that may be executed on the server processor 61 may cause the server processor 61 to invoke an effect in the client, receive an event stream from the client and analyze the received event stream to determine if the received event stream contains an expected response to the invoked effect.

Figure 11:
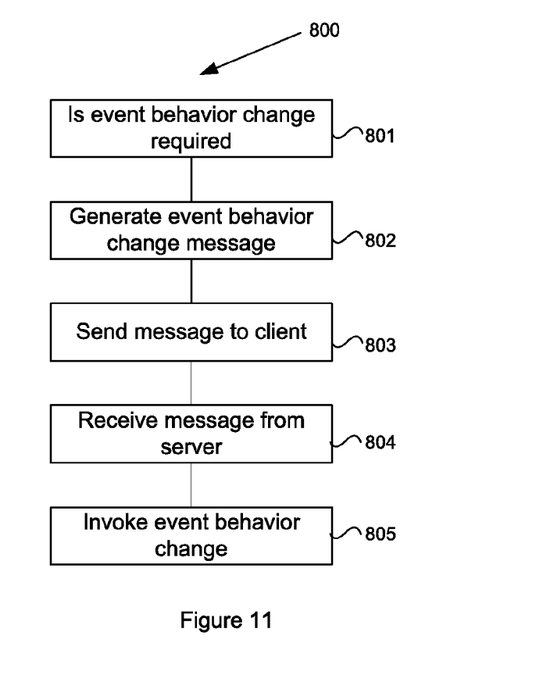
FIG. 11 illustrates an instruction set that may be executed on the processors of FIG. 10.

In one embodiment, the processor may communicate with a second processor 71, such as a client processor through a suitable communications link 65. The client processor 71 may be operatively associated with a memory 72. Together, the server processor and the second processor may execute an instruction set 800, as depicted in FIG. 11, that causes the server processor 61 to determine if a message to invoke a change in event generation behavior is required (step 801) and then generate the message 802 to invoke a change in the event generation behavior at the client. In various embodiments, the generated message may include instructions for a sampling function change, a transparent effect, a non-transparent effect or a dynamic CAPTCHA. At step 803, the server processor may send the message to the client processor, which receives the message 804 and invokes the event behavior change 805. Subsequent instructions may cause the server processer 61 to process further event streams from the client processor 71 to determine whether any change in the event generation behavior is an expected change representing a human-dependent interaction between the client and the web server.

While the servers are depicted as single entities, a person skilled in the art will readily understand that the servers may be provided as multiple servers or with multiple components and in a distributed form.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for determining an event generator type of an interaction between a client and a web server, the method comprising:
providing an effect to the client to invoke a change in event stream generation at the client wherein the affect is a message sent from the web server;
receiving an event stream from the client;
recording the affects as well as any expected reactions to the event stream;
processing future events in the event stream to determine whether the expected reactions occurred within a timeout period;
analyzing the event stream to determine a response to the effect; and
determining an event generator type from the response;
wherein the generator type is set based on at least one of:
whether an expected human-dependent reaction has occurred and if an expected human-dependent reaction has not occurred.

2. The method according to claim 1 further comprising:
receiving a first event stream from the client; and
analyzing the first event stream to determine whether the effect is required to be provided to the client.

3. The method according to claim 2 comprising determining an event generator type of the first event stream, wherein the effect is provided to the client if the event generator type of the first event stream is a non-human event generator type.

4. The method according to claim 2 wherein analyzing the first event stream comprises determining whether a rate of event messages from the client is greater than an allowable rate.

5. The method according to claim 2 wherein analyzing the first event stream comprises determining whether the client is generating events at a rate greater than an allowable rate.

6. The method according to claim 1 wherein providing the effect comprises changing an event sampling function that controls how events are sampled at the client.

7. The method according to claim 6 wherein changing the event sampling function comprises changing at least one of an event observer mask, a sampling interval, or a sampling area of a browser on the client.

8. The method according to claim 6 wherein determining a response to the effect comprises determining whether the client is honoring the change to the event sampling function.

9. The method according to claim 1 wherein the effect is substantially unnoticeable to a human operator at the client.

10. The method according to claim 9 wherein the effect comprises at least one of a mouse pointer shift, a freeze of a mouse pointer, a change of a viewport size, a cursor shift, or addition of a new frame to shift a current viewport.

11. The method according to claim 1 wherein the effect comprises a nontransparent effect that invokes an effect at the client that is noticeable to a human operator at the client.

12. The method according to claim 11 wherein the nontransparent effect comprises at least one of a mouse pointer shift, a freeze of a mouse pointer, a change of the viewport size, a cursor shift, or addition of a new frame to shift a current viewport.

13. The method according to claim 1 wherein determining a response to the effect comprises determining whether an event stream generated in response to the effect is human dependent.

14. The method according to claim 13 comprising terminating the interaction if the event stream generated in response to the effect is not human dependent.

15. A system for testing an interaction between a client and a web server, the system comprising:
the client;
the web server;
an event module within the web server and configured to:
invoke an effect in a web browser of the client to produce a change in event stream generation at the client, wherein the effect is a message sent from the web server;

record the effect as well as any expected reactions to the event stream;

process future events in the event stream to determine whether the expected reactions occurred within a timeout period; and analyze an event stream received from the client to determine whether a response to the effect is a human dependent response wherein the human dependent response is based on at least one of: whether an expected human-dependent reaction has occurred and if an expected human-dependent reaction has not occurred.

16. The system according to claim 15, wherein the event module is configured to analyze the event stream to determine whether the event stream comprises a series of events that correspond to an expected response to the invoked effect.

17. The system according to claim 16 further comprising a prerecorded dataset comprising event streams corresponding to the expected response to the invoked effect, wherein each event stream of the dataset comprises an associated known event generator type.

* * * * *